No. 776,080. PATENTED NOV. 29, 1904.
J. McMYLER.
TRUCK DRIVING MECHANISM.
APPLICATION FILED DEC. 14, 1903.
NO MODEL. 2 SHEETS—SHEET 1.

Witnesses:
A. L. Lord.
B. B. Brockett.

Inventor
John McMyler,
By Thurston & Bates,
Attorneys.

No. 776,080.

Patented November 29, 1904.

UNITED STATES PATENT OFFICE.

JOHN McMYLER, OF CLEVELAND, OHIO.

TRUCK-DRIVING MECHANISM.

SPECIFICATION forming part of Letters Patent No. 776,080, dated November 29, 1904.

Application filed December 14, 1903. Serial No. 185,076. (No model.)

*To all whom it may concern:*

Be it known that I, JOHN MCMYLER, a citizen of the United States, residing at Cleveland, in the county of Cuyahoga and State of Ohio, have invented a certain new and useful Improvement in Truck-Driving Mechanism, of which the following is a full, clear, and exact description, reference being had to the accompanying drawings.

This invention is for the purpose of propelling trucks by means of a motor on a platform which is supported on the truck by means which permit the platform to turn about a vertical axis relative to said truck. Such mechanism may serve as the substructure of a movable derrick.

The invention consists in the construction and combinations of parts hereinafter described, and set forth definitely in the claim.

Figure 1:
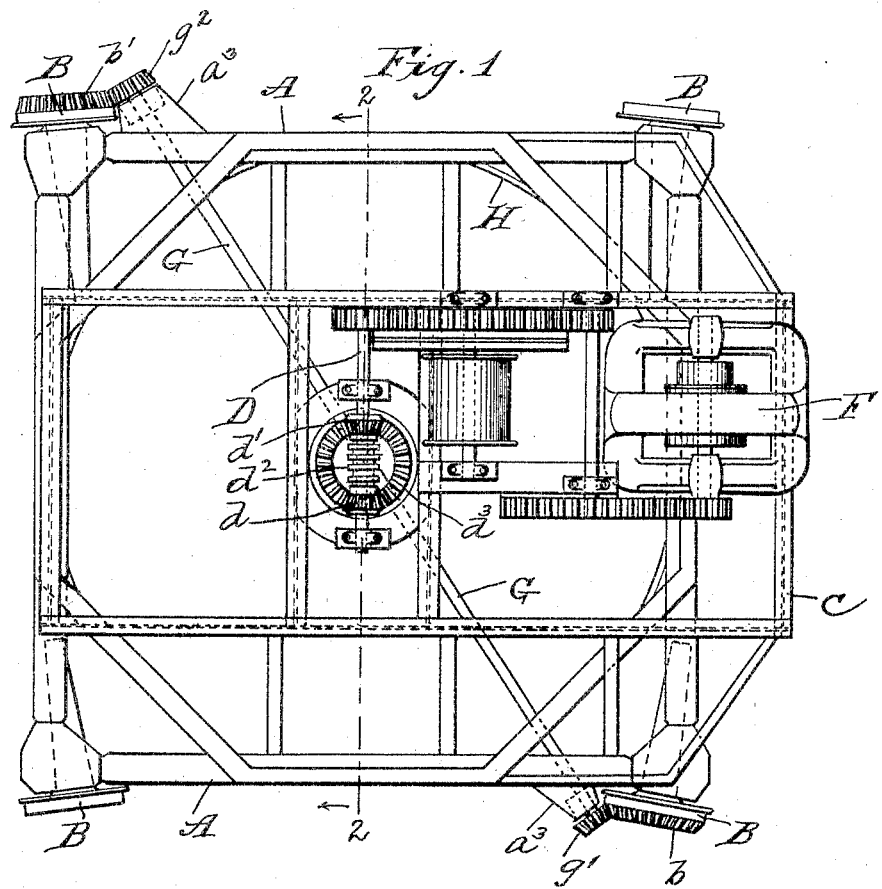
Figure 2:
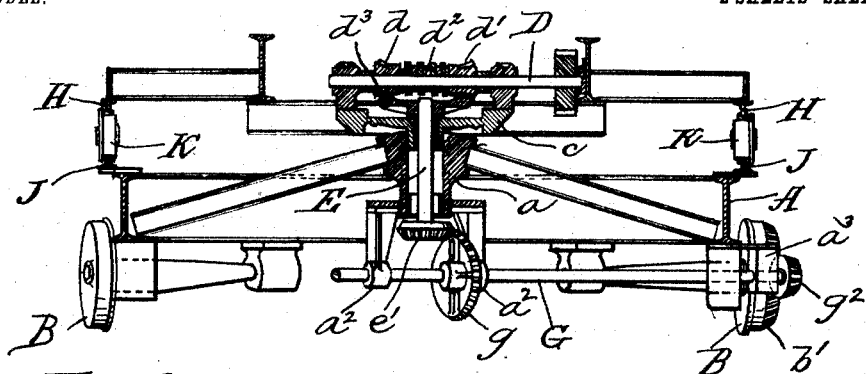
Figure 3:
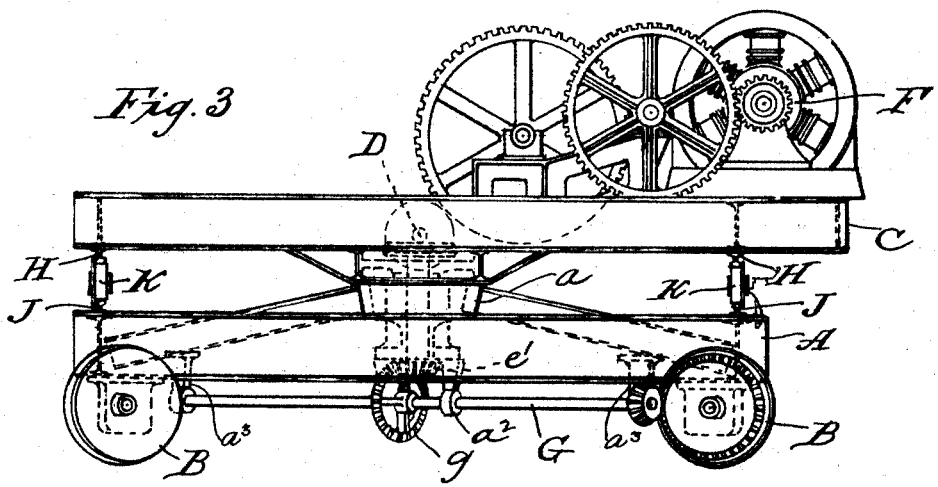

In the drawings, Figure 1 is a plan view of a structure embodying the invention. Fig. 2 is a vertical sectional view in the plane indicated by line 2 2, Fig. 1. Fig. 3 is a side elevation.

Referring to the parts by letters, A represents the truck, which is provided with four independently-mounted wheels B. The embodiment of the invention shown is one whereby the truck is adapted to run a curved track, and therefore the axes of the wheels are set angularly with respect to the ends of the truck.

C represents the platform, which supports the motor F and on which hoisting apparatus may be secured. It is provided with a centrally-placed depending sleeve $c$, which enters a cylindrical recess in a vertical sleeve $a$, rigidly secured to the truck. On the under side of the platform and on the upper side of the truck are respectively the circular tracks H and J, which are concentric with the sleeves $a$ and $c$. Between these tracks are placed a plurality of wheels K, by which the platform C is supported as it turns about its axis. The described mechanism for supporting the platform is not essential to the present invention. Neither is it essential that any mechanism be provided for turning the platform. As a matter of fact, however, some mechanism for this purpose will ordinarily be provided.

D represents the horizontal shaft, which is mounted in suitable bearings upon the platform, which shaft is driven from the motor F, also supported on the platform through any appropriate power-transmitting mechanism. On the shaft D two bevel-gears $d\ d'$ are rotatably mounted, and the clutch $d^2$ is provided for connecting either gear to said shaft. These two bevel-gears mesh with the bevel-gear $d^3$ on the upper end of a vertical shaft E, which passes axially down through the sleeves $a$ and $c$, in which it is rotatably mounted. It will be driven in one direction when the bevel-gear $d$ is clutched to its shaft D and will be driven in the opposite direction when the bevel-gear $d'$ is clutched to said shaft, and it will be so driven irrespective of the position of the platform C relative to the truck. On the lower end of the shaft E is another bevel-gear $e'$, which meshes with the bevel $g$ on the diagonally-disposed shaft G. This shaft is rotatably mounted in suitable bearing-brackets $a^2\ a^3$, which depend from the truck. To the ends of this shaft the bevel-gears $g'\ g^2$ are secured, and these bevel-gears mesh, respectively, with bevel-gears $b\ b'$, secured to a wheel B on one side of the truck at its front end and to a wheel B on the other side of the truck at its rear end. The rotation of this shaft G will turn both of these truck-wheels in the same direction, so as to cause the truck to move forward if the shaft G is rotating in one direction or backward if the shaft G is rotating in the opposite direction.

I claim—

A truck having two pairs of running-wheels, and two beveled gears which are respectively connected rigidly with diagonally opposite wheels, combined with a diagonally-extended shaft mounted in bearings secured to the truck and carrying beveled gears which respectively mesh with the beveled gears fixed to the running-wheels, a platform supported on said truck and adapted to turn thereon in a horizontal plane on a vertical axis, a motor upon said platform, a rotatable vertical shaft whose axis is coincident with the axis of the platform, power-transmitting mechanism intermediate of the motor and this vertical shaft, and meshing beveled gears respectively secured to said vertical shaft and to the diagonal shaft, substantially as and for the purpose specified.

In testimony whereof I hereunto affix my signature in the presence of two witnesses.

JOHN McMYLER.

Witnesses:
E. L. THURSTON,
B. W. BROCKETT.